(12) United States Patent
Catalan et al.

(10) Patent No.: US 12,379,088 B2
(45) Date of Patent: Aug. 5, 2025

(54) AUTOMOTIVE TRIM COMPONENT

(71) Applicants: SRG Global Liria, S.L., Liria (ES); SRG Global Germany GmbH, Munich (DE)

(72) Inventors: Luis Catalan, Munich (DE); Antonio Escriba, Liria (ES); Juan Monleon, Liria (ES)

(73) Assignees: SRG GLOBAL LIRIA, S.L., Liria (ES); SRG GLOBAL GERMANY GMBH, Munich (DE)

( * ) Notice: Subject to any disclaimer, the term of this patent is extended or adjusted under 35 U.S.C. 154(b) by 0 days.

(21) Appl. No.: 18/836,767

(22) PCT Filed: Feb. 10, 2023

(86) PCT No.: PCT/IB2023/051206
§ 371 (c)(1),
(2) Date: Aug. 8, 2024

(87) PCT Pub. No.: WO2023/152697
PCT Pub. Date: Aug. 17, 2023

(65) Prior Publication Data
US 2025/0146640 A1    May 8, 2025

(30) Foreign Application Priority Data
Feb. 11, 2022    (ES) ................. P202230111

(51) Int. Cl.
*F21S 41/50* (2018.01)
*B60R 19/52* (2006.01)
(Continued)

(52) U.S. Cl.
CPC ............... *F21S 41/50* (2018.01); *F21S 41/24* (2018.01); *B60R 2019/525* (2013.01); *F21Y 2115/10* (2016.08)

(58) Field of Classification Search
CPC ....... F21S 41/50; F21S 41/24; F21Y 2115/10; B60R 2019/525; F21V 23/001; F21V 23/002
See application file for complete search history.

(56) References Cited

U.S. PATENT DOCUMENTS 9,714,749 B1    7/2017    Salter
9,863,600 B2    1/2018    Kieslich
(Continued)

FOREIGN PATENT DOCUMENTS

CN    208058733 U    11/2018
CN    212408542 U    1/2021
(Continued)

OTHER PUBLICATIONS

International Preliminary Report on Patentability received for PCT Application No. PCT/IB2023/051206, mailed on Aug. 22, 2024, 10 pages.
(Continued)

*Primary Examiner* — Erin Kryukova
(74) *Attorney, Agent, or Firm* — Alston & Bird LLP

(57) ABSTRACT

Example components, methods of manufacturing, and/or the like are provided for an automotive trim component (100). In some embodiments, an automotive trim component (100) may include a lightguide assembly (128) including a set of illumination elements configured to generate light and a lightguide for directing the generated light; a front cover (104) including a combination of a transparent or translucent resin and an opaque resin; and a back cover (108) configured to act as a carrier for the lightguide assembly (128), the back cover (108) including an electrical harness (132) and a rib (136) disposed around at least a portion of the lightguide assembly (128), wherein the rib (136) is configured to contain and support the electrical harness (132).

15 Claims, 6 Drawing Sheets

(51) Int. Cl.
  *F21S 41/24*      (2018.01)
  *F21Y 115/10*     (2016.01)

(56) References Cited

U.S. PATENT DOCUMENTS

| | | | |
|---|---|---|---|
| 10,281,113 B1* | 5/2019 | Salter | B60R 19/483 |
| 2005/0183262 A1 | 8/2005 | Schoemann | |
| 2015/0003093 A1* | 1/2015 | Omura | B60Q 3/78 |
| | | | 362/511 |
| 2015/0241015 A1* | 8/2015 | Johnson | F21S 43/14 |
| | | | 362/509 |
| 2019/0271458 A1* | 9/2019 | Brown | F21S 41/285 |
| 2021/0331668 A1 | 10/2021 | Udipi | |
| 2022/0161717 A1* | 5/2022 | Adler | F21S 43/26 |

FOREIGN PATENT DOCUMENTS

| | | | | |
|---|---|---|---|---|
| CN | 113415235 A | 9/2021 | | |
| CN | 113685773 A | 11/2021 | | |
| DE | 102014212148 A1 | 12/2014 | | |
| DE | 102020114257 A1 | 12/2021 | | |
| EP | 3878690 A1 * | 9/2021 | ........... | B60Q 1/2611 |
| ES | 2772938 A1 | 7/2020 | | |
| WO | WO-2020074739 A1 * | 4/2020 | ........... | B60Q 1/0035 |
| WO | 2020212072 A1 | 10/2020 | | |

OTHER PUBLICATIONS

International Search Report and Written Opinion received for PCT Application No. PCT/IB2023/051206, mailed on Jun. 26, 2023, 14 pages.

* cited by examiner

AUTOMOTIVE TRIM COMPONENT

TECHNICAL FIELD

The present application relates to automotive trim components and, more particularly, to illuminated automotive trim components.

BACKGROUND

In today's automotive trim components, it is desirable to incorporate light accents in addition to chrome plating or chrome-like ("near-chrome") plating, particularly near the chrome or near-chrome edges, such as in front grille assemblies. When the automotive trim components are very narrow, challenges arise in terms of tooling design and optics because fixation features need tool sliders to be manufactured and the latter leaves marks in the optical plastic that will interfere with the illumination creating distortions to the emitted light (e.g., an undesirable appearance).

Because the material has a skin and a core, both materials/phases need to have certain minimum thicknesses to be molded (e.g., no less than 1.5 millimeters (mm) to 2 mm in a complete part, or even more for larger parts). This causes the total inner thickness from the defined vehicle external surface to be greater than 4 mm. When the components are narrow and slender, then it becomes a challenge to be able to allocate the illumination elements (lightguide, carrier, light emitting diodes (LEDs), etc.). Including fixation features into the multi-shot part increases tool complexity and may limit tool feasibility.

Through applied effort, ingenuity, and innovation, Applicant has solved problems relating to illuminating automotive trim components by developing solutions embodied in the present disclosure, which are described in detail below.

SUMMARY

In general, embodiments of the present disclosure provide example components, methods of manufacturing, and/or the like. According to various embodiments, there is provided an automotive trim component. In some embodiments, the automotive trim component includes a lightguide assembly including a set of illumination elements configured to generate light and a lightguide for directing the generated light; a front cover including a combination of a transparent or translucent resin and an opaque resin; and a back cover configured to act as a carrier for the lightguide assembly, the back cover including an electrical harness and a rib disposed around at least a portion of the lightguide assembly. In some embodiments, the rib is configured to contain and support the electrical harness.

In some embodiments, the component is a lamp assembly for a vehicle.

In some embodiments, the lamp assembly is part of a grille assembly of the vehicle.

In some embodiments, the front cover is formed using a multi-shot injection molding process.

In some embodiments, the transparent or translucent resin is composed of one or more of polycarbonate (PC) or poly(methyl methacrylate) (PMMA), and the opaque resin is composed of one or more of acrylonitrile butadiene styrene (ABS), PC, PMMA, or acrylonitrile styrene acrylate (ASA).

In some embodiments, the opaque resin is a plateable resin including a metallic layer, and the metallic layer is a chrome or near-chrome plating applied to the opaque plateable resin via an electroplating deposition technique.

In some embodiments, the set of illumination elements includes at least one light emitting diode (LED).

In some embodiments, the automotive trim component includes a metallic component, a painted component, or a mold in color component. According to various embodiments, there is provided a method of manufacturing an automotive trim component. In some embodiments, the methods includes providing a lightguide assembly including a set of illumination elements configured to generate light and a lightguide for directing the generated light; forming a front cover including a combination of a transparent or translucent resin and an opaque resin; and forming a back cover configured to act as a carrier for the lightguide assembly, the back cover including an electrical harness and a rib disposed around at least a portion of the lightguide assembly. In some embodiments, the rib is configured to contain and support the electrical harness.

In some embodiments, the component is a lamp assembly for a vehicle.

In some embodiments, the lamp assembly is part of a grille assembly of the vehicle.

In some embodiments, the forming of the front cover further includes using a multi-shot injection molding process to form the front-cover.

In some embodiments, the transparent or translucent resin is composed of one or more of polycarbonate (PC) or poly(methyl methacrylate) (PMMA), and the opaque resin is composed of one or more of acrylonitrile butadiene styrene (ABS), PC, PMMA, or acrylonitrile styrene acrylate (ASA).

In some embodiments, the opaque resin is a plateable resin including a metallic layer, and the metallic layer is a chrome or near-chrome plating applied to the opaque plateable resin via an electroplating deposition technique.

In some embodiments, the set of illumination elements includes at least one light emitting diode (LED).

In some embodiments, the automotive trim component is a metallic component, a painted component, or a mold in color component.

According to various embodiments, there is provided a front grille assembly for a vehicle. In some embodiments, the front grille assembly includes a housing; and an automotive lamp assembly at least partially disposed within the housing. In some embodiments, the lamp assembly includes a lightguide assembly including a set of illumination elements configured to generate light and a lightguide for directing the generated light; a front cover including a combination of a transparent or translucent resin and an opaque resin; and a back cover configured to act as a carrier for the lightguide assembly, the back cover including an electrical harness and a rib disposed around at least a portion of the lightguide assembly. In some embodiments, the rib is configured to contain and support the electrical harness.

In some embodiments, the front cover is formed using a multi-shot injection molding process.

In some embodiments, the transparent or translucent resin is composed of one or more of polycarbonate (PC) or poly(methyl methacrylate) (PMMA), and the opaque resin is composed of one or more of acrylonitrile butadiene styrene (ABS), PC, PMMA, or acrylonitrile styrene acrylate (ASA).

In some embodiments, the automotive lamp assembly is a metallic component, a painted component, or a mold in color component.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the examples of the present disclosure are intended to be within the scope of the present disclosure.

BRIEF DESCRIPTION OF THE DRAWINGS

Figure 1:
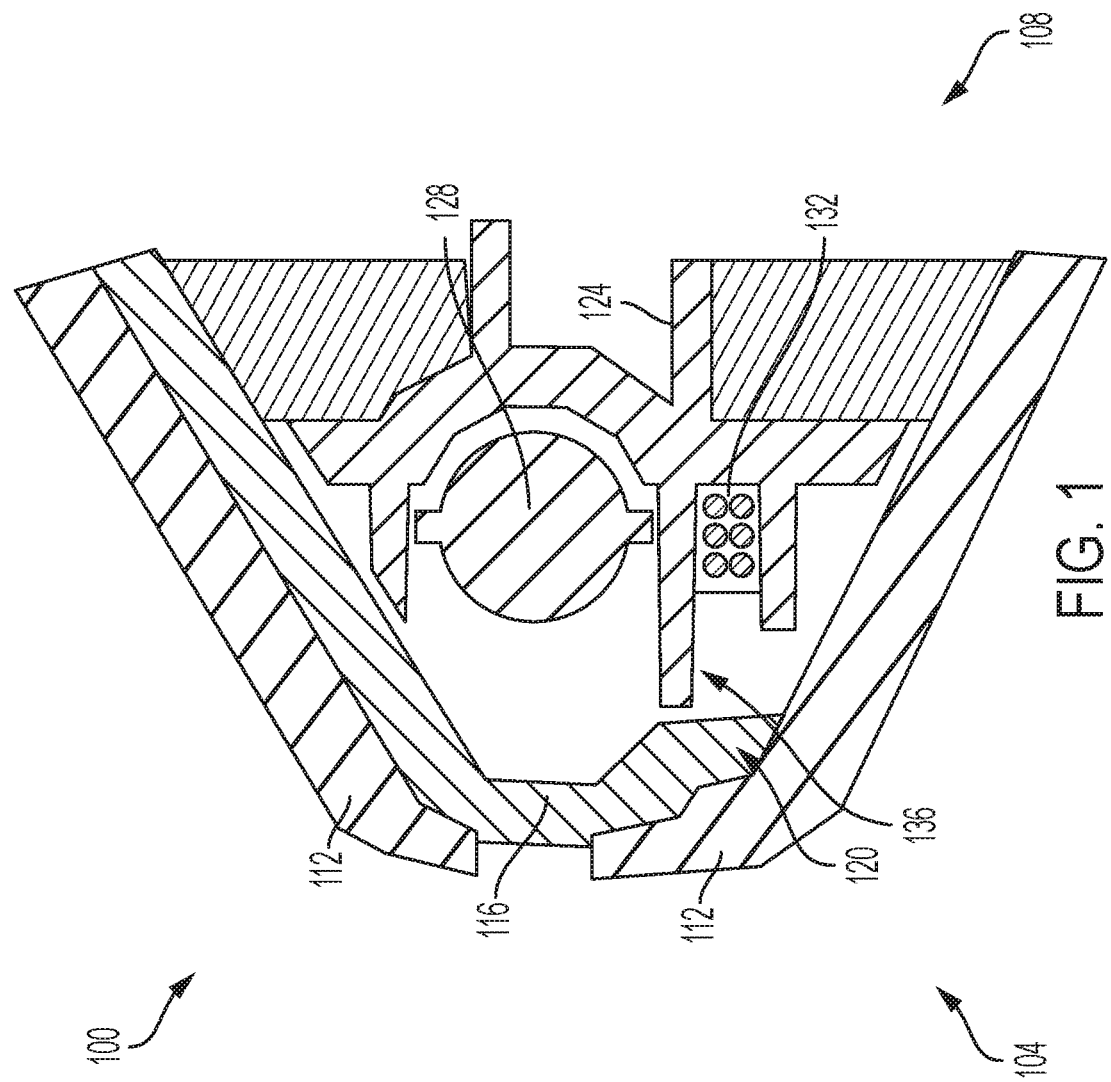
Figure 2:
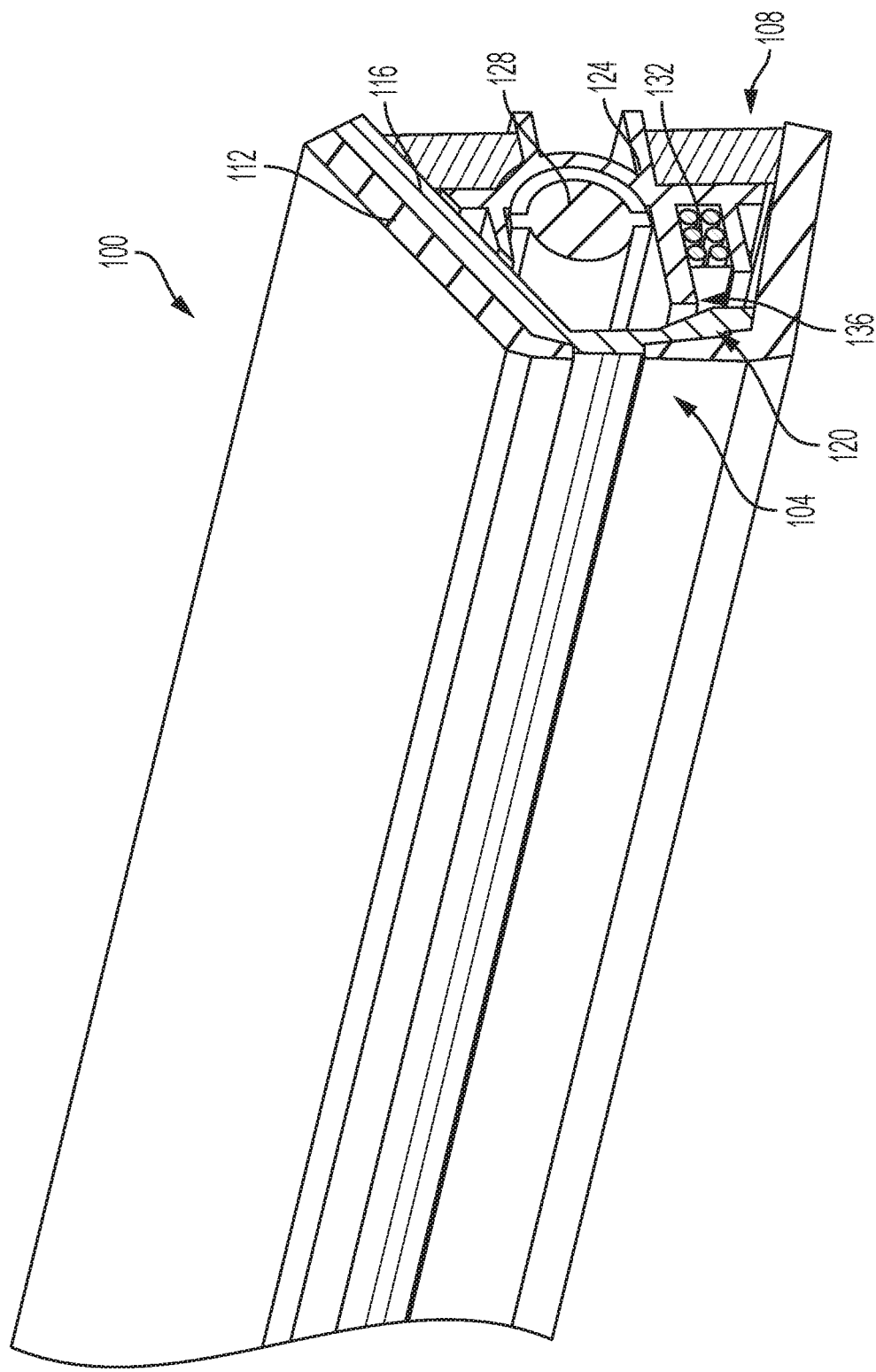
Figure 3:
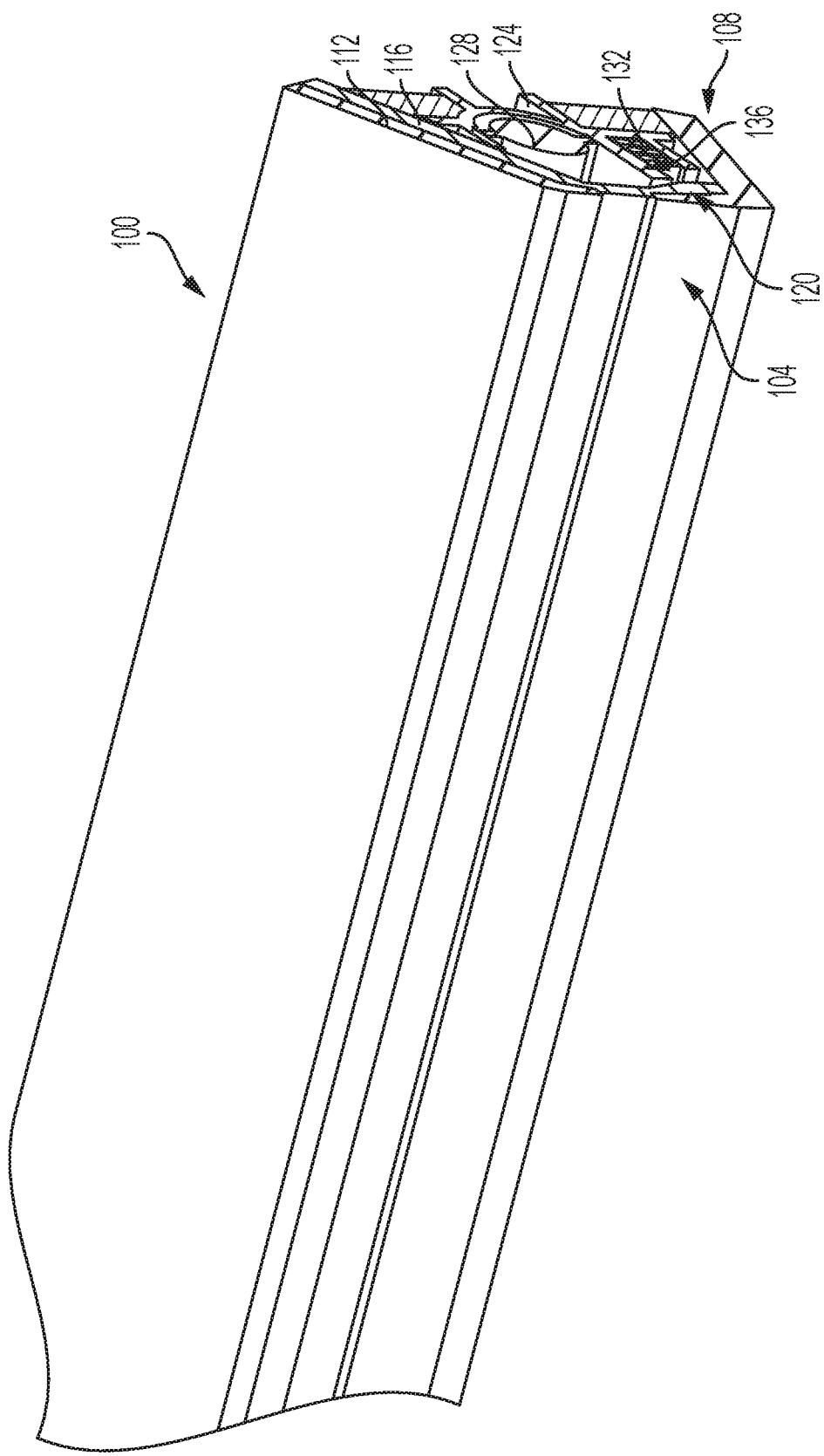
Figure 4:
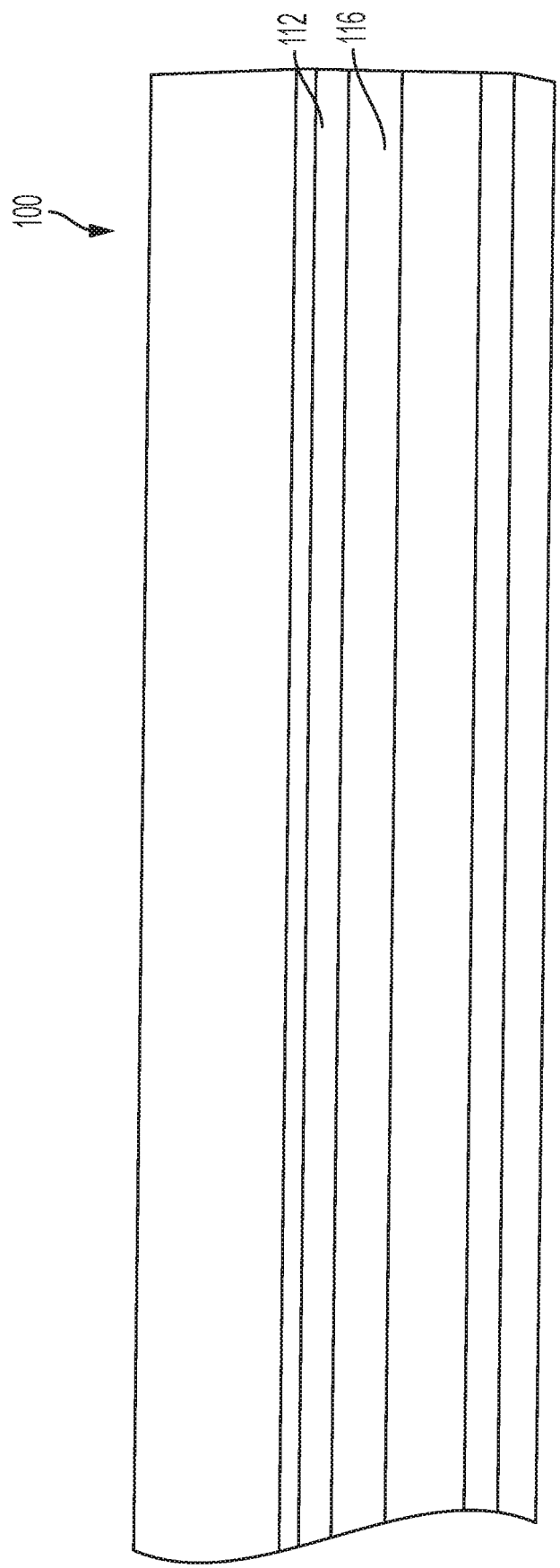
Figure 5:
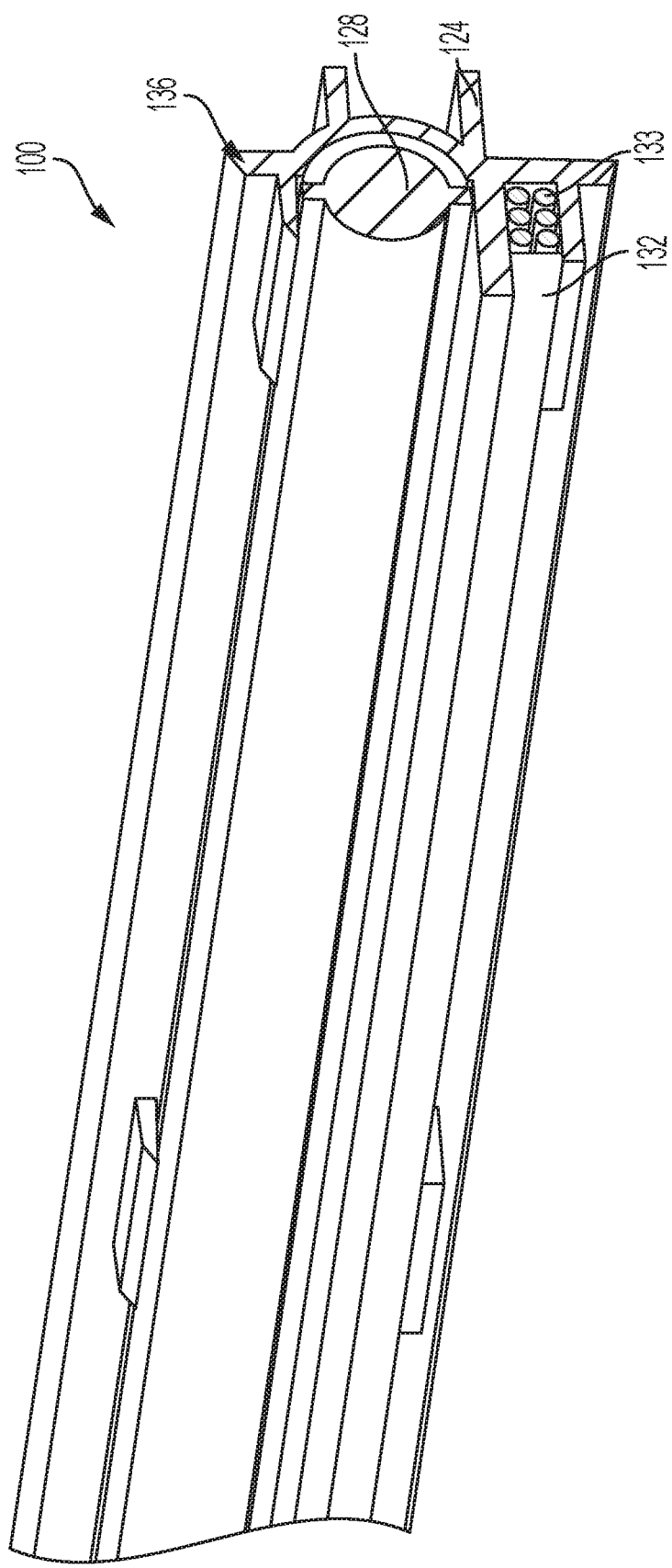
Figure 6:
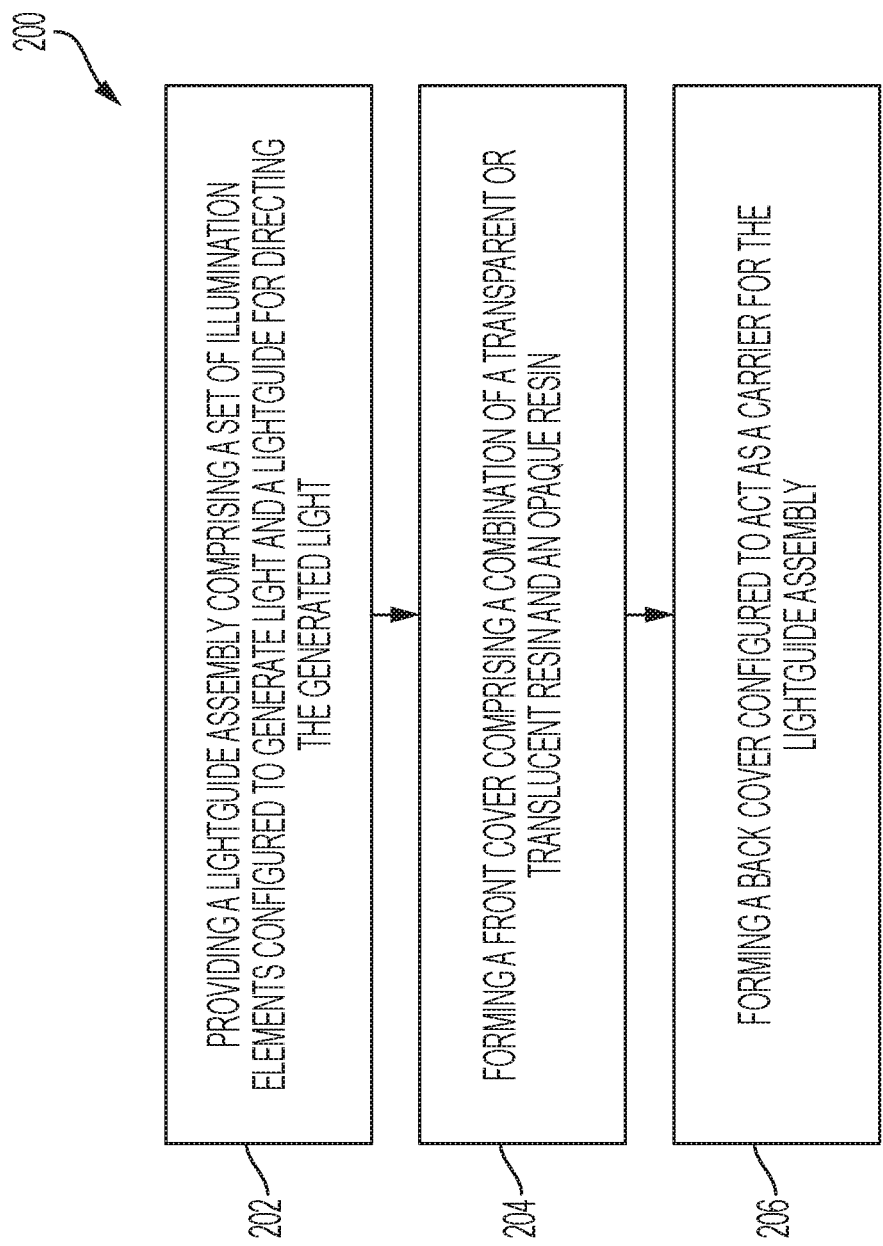

Having thus described the disclosure in general terms, reference will now be made to the accompanying drawings, which are not necessarily drawn to scale, and wherein:

FIG. 1 is a side elevated cross-sectional view of an example automotive trim component according to some embodiments of the present disclosure;

FIGS. 2 and 3 are top perspective, cross-sectional views of an example automotive trim component according to some embodiments of the present disclosure;

FIG. 4 is a front view of an example automotive trim component according to some embodiments of the present disclosure;

FIG. 5 is an internal, cross-sectional view of an example automotive trim component according to some embodiments of the present disclosure; and FIG. 6 is a flow diagram of an example method of manufacturing an automotive trim component according to some implementations of the present application.

DETAILED DESCRIPTION

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these aspects are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiments," "according to one embodiment," and/or the like generally mean that the particular feature, structure, or characteristic following the phrase may be included in at least one aspect of the present disclosure and may be included in more than one embodiment of the present disclosure (importantly, such phrases do not necessarily refer to the same embodiment).

Example Automotive Trim Components

As previously discussed, when automotive trim components are very narrow, challenges arise in terms of tooling design and optics, at least for the reason that fixation features need tool sliders to be manufactured and the latter leaves marks in the optical plastic that will interfere with the illumination creating distortions to the emitted light (e.g., an undesirable appearance). Because the material has a skin and a core, both materials/phases need to have certain minimum thicknesses in order to be molded (e.g., no less than 1.5 millimeters (mm) to 2 mm in a complete part, or even more if the part is big). This causes the total inner thickness from the defined vehicle external surface to be greater than 4 mm. When the components are narrow and slender, then it may be a challenge to be able to allocate in this area the illumination elements (lightguide, carrier, light emitting diodes (LEDs), etc.).

While including fixation features into a multi-shot part increases tool complexity and may limit tool feasibility. Thus, while illuminated chrome and near-chrome automotive trim components and their methods of manufacture do work for their intended purpose, there remains a desire for improvement in the relevant art. Accordingly, there is provided improved automotive trim components and their methods of manufacture. According to various embodiments, the automotive trim components may be metallic, painted, or mold in components. The term "metallic" as used herein will be appreciated to encompass both chrome and chrome-like ("near-chrome") layers, such as chrome electroplating or metallic-looking particle deposition (e.g., physical vapor deposition, or PVD) or a metallic-looking film. It will also be appreciated that while automotive trim components and, in particular, a lamp assembly (e.g., of a vehicle front grille assembly) are shown and described herein, the techniques of the present disclosure could be applicable to any suitable vehicle or non-vehicle trim component.

Referring now to FIGS. 1-5, several different view of an example automotive trim component 100 (or "the component") according to various embodiments of the present disclosure are illustrated. According to various embodiments, the component 100 may be a metallic component, a painted component, or a mold in color component for use in automotive or other purposes. In some embodiments, and as previously mentioned, the component 100 may be a lamp assembly (e.g., of a vehicle front grille assembly), and an example lamp assembly is illustrated in the various figures. However, it will be appreciated that the techniques of the present disclosure could be applicable to any vehicle or non-vehicle automotive trim components.

In some embodiments, the component 100 includes a front cover 104 and a back cover 108. In some embodiments, the front cover 104 includes a first portion 112 and a second portion 116. In some embodiments, the first and second portions 112, 116 may be ring-shaped. In other embodiments, the first and second portions 112, 116 may be linear. In some embodiments, the first portion 112 may be defined as an outer ring and the second portion 116 may be defined as an inner ring. In some embodiments, the first and second portions 112, 116 may be adjacent to one another and substantially flush. In some embodiments, the first portion 112 may be a single piece disposed on the exterior of the front cover 104, while in other embodiments the first portion 112 may have discontinuous portions such that the second portion 116 is disposed on the exterior of the front cover at these discontinuous portions.

Various methods may be used according to certain embodiments to form the front cover 104. In some embodiments, the front cover 104 is formed using a multi-shot injection molding process (e.g., two shots). For example, a first (outer ring) portion 112 of the front cover 104 could be formed of a resin (e.g., dark or black acrylonitrile butadiene styrene (ABS) or polycarbonate (PC)) and a second (inner ring) portion 116 of the front cover 104 could be formed of a transparent or translucent resin (e.g., clear polycarbonate (PC) or poly(methyl methacrylate) (PMMA)); that is, in some embodiments, one or more sections of the second portion 116 may be transparent or translucent. In some embodiments, the front cover 104 could be formed of a plateable resin and/or a non-plateable resin. In some embodiments, when the opaque resin is plateable, the outer ring portion 112 further includes a chrome or near-chrome plating layer applied to the opaque plateable resin via an electroplating or deposition technique. Reference 120 identifies the second portion 116 (the "diffusing layer") extending until a radius of the component 100, according to various embodiments. In some embodiments, the opaque resin could additionally or alternatively be composed of PMMA. In some embodiments, the opaque resin may be composed additionally or alternatively of PMMA or acrylonitrile styrene acrylate (ASA).

In some embodiments, the first and second portions 112, 116 may be connected to each other in a variety of different ways. For example, during the molding process of the component 100, the first and second portions 112, 116 may be connected with a multi-shot injection. However, in other embodiments, various other connection mechanisms may be used to connect the first and second portions 112, 116, including but not limited to snap features, over-molding (e.g., by inserting the first 112 or second 116 portion into a different injection tool), ultrasonic/vibration welding, heat staking, by one or more adhesives, and by any other suitable connection as desired.

In some embodiments, the back cover 108 of the component 100 includes a carrier portion 124. In some embodiments, the carrier portion 124 may be configured to support a lightguide assembly 128. In some embodiments, the carrier portion 124 may have a substantially semi-circular or horseshoe shape. In some embodiments, the carrier portion 124 may include one or more protrusions extending from the semi-circular shape. The carrier portion 124 may be configured in a variety of shapes to provide sufficient support to the lightguide assembly 128.

In some embodiments, the lightguide assembly 128 generally includes a set of illumination elements (e.g., one or more light bulbs or LEDs) configured to generate light and a lightguide configured to direct the generated light (e.g., outwardly from the component 100 substantially in the direction of the front cover 104). In some embodiments, these illumination elements may be disposed on the lightguide assembly 128, such as by being integrated into the structure of the lightguide assembly 128 (e.g., the illumination elements may be embedded in the structure of the assembly 128). The carrier portion 124 acts as a carrier for the lightguide assembly 128 by providing or defining a set of fixation features (e.g., attachments, such as a clip or a holder disposed on or integrated with the lightguide assembly 128) to the illumination elements coming only from the carrier portion 124, thereby avoiding any potential defect caused by slider marks in the optical polymer of the transparent or translucent sections of the second portion 116 of the front cover 104.

In some embodiments, the back cover 108 also integrates an electrical harness 132 for the lightguide assembly 128. In some embodiments, the electrical harness 132 may be embedded within or fixedly or operably attached to the carrier portion 124. In some embodiments, the electrical harness 132 may be disposed substantially adjacent to the lightguide assembly 128 and configured to power the lightguide assembly 128 (e.g., via one or more wires 133). In some embodiments, the electrical harness 132 may be fixedly or operably attached to the back cover 108 such that one or more wires 133 connecting the electrical harness 132 to the lightguide assembly 128 may be embedded within the carrier portion 124. This can be seen in at least FIG. 5. In some embodiments, other elements besides the lightguide assembly 128 of the component 100 may be powered by the electrical harness 132.

In some embodiments, the back cover 108 also includes or defines a rib 136. In some embodiments, the rib 136 may be included in or defined by the carrier portion 124. In some embodiments, the rib 136 is constant thickness or near-constant thickness. In some embodiments, the rib 136 may be disposed around the lightguide assembly 128. In some embodiments, the rib 136 may be configured to contain and support the electrical harness 132 such that the electrical harness is held within the rib 136. In some embodiments, the rib 136 may conceal the electrical harness 132 partially or entirely; that is, an observer of component 100 would not be able to see the electrical harness 132. In some embodiments, the rib 136 may aid in optimizing optical performance and aesthetic appearance in cold (non-illuminated) and warm (illuminated) conditions. For example, the rib 136 may be composed of polycarbonate (PC), acrylonitrile butadiene styrene (ABS), a combination of PC and ABS, or a combination of ABS and polypropylene (PP). In some embodiments, this proposed design also eliminates the risk for light distortions due to marks, non-constant features, and the like when illuminated at least because the rib 136 is continuous in some embodiments, thereby providing an even visual appearance. Further, this proposed design may assist in eliminating the risk for visible see-through defects and/or variations when in cold conditions (that is, when non-illuminated). Lastly, this proposed design allows for the minimization of space/packaging requirements by optimizing and minimizing the space required for the lightguide assembly 128 (e.g., the optical channel optimized for the illuminated window), which allows, for example, to allocate the electrical harness 132 for the lightguide assembly 128 to be integrated therein (e.g., a better or more efficient assembly process), thereby avoiding the need to disconnect/reconnect components during the assembly process. In some embodiments, the proposed design may minimize performance and/or protection requirements of the harness 132 at least by minimizing the packaging requirements for the harness 132.

Example Methods of Manufacturing Automotive Trim Components

Referring now to FIG. 6, a flow diagram of an example method 200 of manufacturing an automotive trim component according to some implementations of the present disclosure is illustrated. While the elements of component 100 are specifically referenced for illustrative purposes for the present disclosure, it will be appreciated that this method 200 could be applicable for the manufacturing of other suitable vehicle and non-vehicle trim components. In some embodiments, the method 200 may include a step 202 of providing a lightguide assembly including a set of illumination elements configured to generate light and a lightguide for directing the generated light. In some embodiments, the method 200 may include a step 204 of forming a front cover including a combination of a transparent or translucent resin and an opaque resin. In some embodiments, the method 200 may include a step 206 of forming a back cover configured to act as a carrier for the lightguide assembly. In some embodiments, the method 200 may repeat; that is, the method 200 may return to step 202 for one or more additional manufacturing cycles.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An automotive trim component, the component comprising:
    a lightguide assembly configured to generate light and for directing the generated light;
    a front cover comprising a combination of a transparent or translucent resin and a non-transparent or non-translucent resin; and
    a back cover configured to define an optical channel between the back cover and the front cover and act as a carrier for the lightguide assembly within the optical channel,
    wherein:
        the back cover comprises an electrical harness and a rib disposed around at least a portion of the lightguide assembly, and
        the rib is configured to contain and support the electrical harness within the optical channel.

2. The component of claim 1, wherein the component comprises a lamp assembly for a vehicle.

3. The component of claim 2, wherein the lamp assembly comprises part of a grille assembly of the vehicle.

4. The component of claim 1, wherein the non-transparent or non-translucent resin is an opaque resin.

5. The component of claim 1, wherein the transparent or translucent resin is composed of one or more of polycarbonate (PC) or poly(methyl methacrylate) (PMMA), and the non-transparent or non-translucent resin is composed of one or more of acrylonitrile butadiene styrene (ABS), PC, PMMA, or acrylonitrile styrene acrylate (ASA).

6. The component of claim 5, wherein the non-transparent or non-translucent resin is a metallic plateable resin.

7. A method of manufacturing an automotive trim component, the method comprising:
    providing a lightguide assembly configured to generate light and for directing the generated light;
    forming a front cover comprising a combination of a transparent or translucent resin and a non-transparent or non-translucent resin; and
    forming a back cover configured to define an optical channel between the back cover and the front cover and act as a carrier for the lightguide assembly within the optical channel, the back cover comprising an electrical harness and a rib disposed around at least a portion of the lightguide assembly, the rib being configured to contain and support the electrical harness within the optical channel.

8. The method of claim 7, wherein the component comprises a lamp assembly for a vehicle.

9. The method of claim 8, wherein the lamp assembly comprises part of a grille assembly of the vehicle.

10. The method of claim 7, wherein the forming the front cover further comprises using a multi-shot injection molding process to form the front cover.

11. The method of claim 10, wherein the transparent or translucent resin is composed of one or more of polycarbonate (PC) or poly(methyl methacrylate) (PMMA), and the non-transparent or non-translucent resin is composed of one or more of acrylonitrile butadiene styrene (ABS), PC, PMMA, or acrylonitrile styrene acrylate (ASA).

12. The method of claim 11, wherein the non-transparent or non-translucent resin is a metallic plateable resin formed via an electroplating deposition technique.

13. A front grille assembly for a vehicle, the front grille assembly comprising an automotive lamp assembly comprising:
    a lightguide assembly configured to generate light and for directing the generated light;
    a front cover comprising a combination of a transparent or translucent resin and a non-transparent or non-translucent resin; and
    a back cover configured to define an optical channel between the back cover and the front cover and act as a carrier for the lightguide assembly within the optical channel, the back cover comprising an electrical harness and a rib disposed around at least a portion of the lightguide assembly, the rib being configured to contain and support the electrical harness within the optical channel.

14. The lamp assembly of claim 13, wherein the non-transparent or non-translucent resin is an opaque resin.

15. The lamp assembly of claim 13, wherein the transparent or translucent resin is composed of one or more of polycarbonate (PC) or poly(methyl methacrylate) (PMMA), and the non-transparent or non-translucent resin is composed of one or more of acrylonitrile butadiene styrene (ABS), PC, PMMA, or acrylonitrile styrene acrylate (ASA).

* * * * *